United States Patent
Shigemi et al.

(10) Patent No.: US 7,031,940 B2
(45) Date of Patent: Apr. 18, 2006

(54) CHARGE COLLECTING SYSTEM AND PROGRAM FOR CONTROLLING THE SAME

(75) Inventors: Kazuhiko Shigemi, Tokyo (JP); Shinobu Hasebe, Saitama (JP); Miwa Nishio, Saitama (JP); Hiroya Seshimo, Chiba (JP); Hiroyuki Hatanaka, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 245 days.

(21) Appl. No.: 10/050,553

(22) Filed: Jan. 18, 2002

(65) Prior Publication Data
US 2003/0004890 A1   Jan. 2, 2003

(30) Foreign Application Priority Data
Jun. 29, 2001   (JP) .............................. 2001-199029

(51) Int. Cl.
*G06F 17/00*   (2006.01)
(52) U.S. Cl. .............................. 705/40; 705/34; 705/64
(58) Field of Classification Search .................. 705/34, 705/35, 40, 42, 64
See application file for complete search history.

(56) References Cited
U.S. PATENT DOCUMENTS
5,870,456 A * 2/1999 Rogers ...................... 379/1.01
6,578,015 B1 * 6/2003 Haseltine et al. ............. 705/34

FOREIGN PATENT DOCUMENTS
| JP | 02000101753 A | * | 4/2000 |
| JP | 02004024896 A | * | 1/2004 |
| JP | 02005010946 A | * | 1/2005 |

OTHER PUBLICATIONS
IBM Technical Disclosure Bulletin; Title: Settlement method, settlement information generation device and recording medium, Apr. 7, 2000.*
IBM Technical Disclosure Bulletin; Title: Telephone call connection monitor for a telephone billing system; TDB-ACC-NO: NN87091688; vol. 30; Sep. 1, 1987.*

\* cited by examiner

*Primary Examiner*—Elisca Pierre Eddy
(74) *Attorney, Agent, or Firm*—Rabin & Berdo, PC

(57) ABSTRACT

A system which improves convenience on the user side and contributes to a cost reduction on the sales shop side is provided. A sales shop 2 manages requested contents to the users by a notice information management unit (22) in correspondence to a URL provided for each user. A requested contents notice unit (23) notifies the user of the requested contents managed by the notice information management unit (22) and the user's URL by Email. When there is an access to the URL in the Email from the user and a paying instruction is issued with respect to the requested contents, a settlement unit (24) makes a settlement on a network (5).

20 Claims, 4 Drawing Sheets

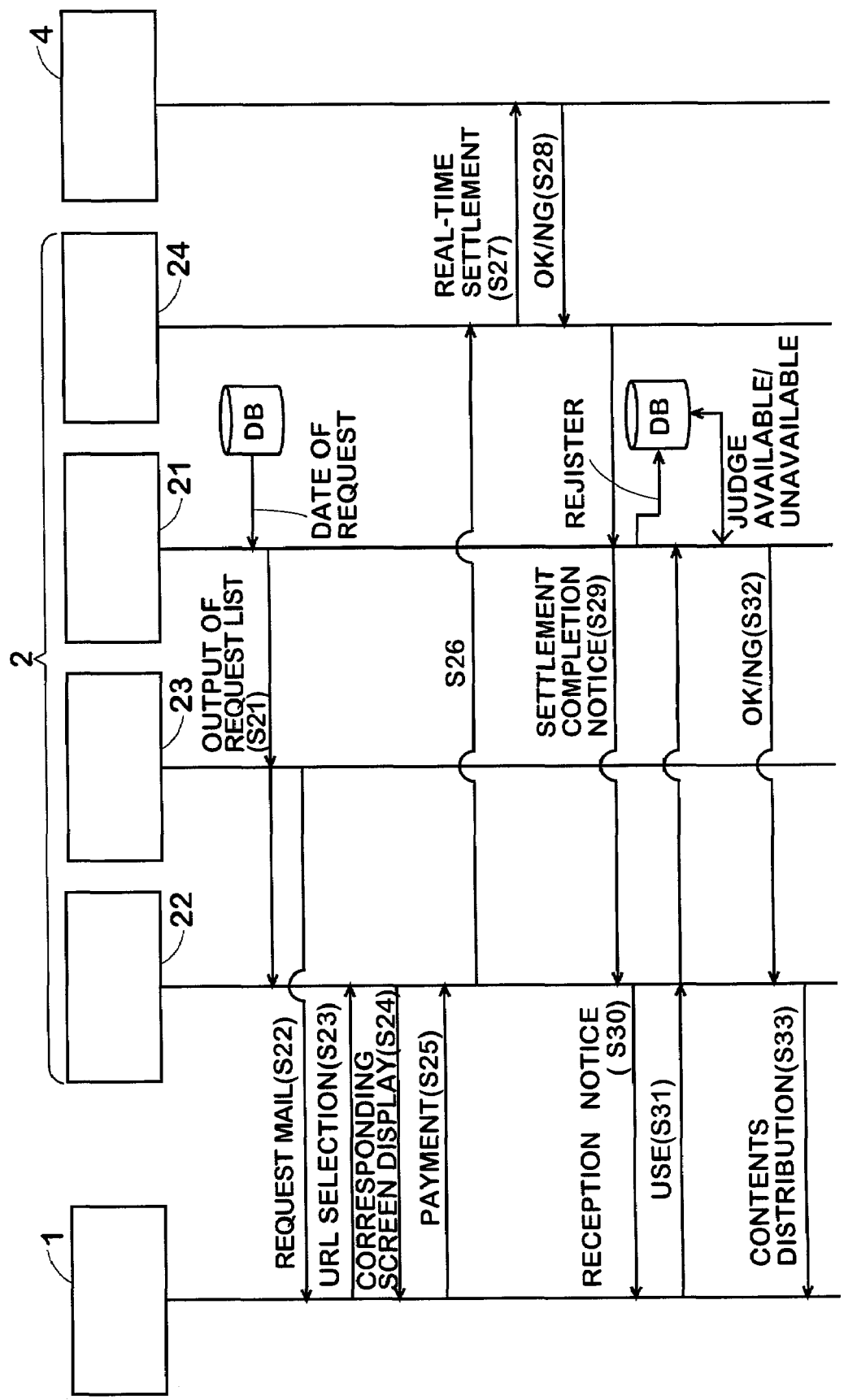

CHARGE COLLECTING SYSTEM AND PROGRAM FOR CONTROLLING THE SAME

BACKGROUND OF THE INVENTION

1. Field of the Invention

The invention relates to a charge collecting system which notifies the user of requested contents on a network and enables the user side to settle an account of the requested contents on the network.

2. Related Background Art

Hitherto, to collect charges in mail-order sales or collect monthly service charges for telephone charges or subscription of magazines, a bill of the charge is mailed to the user and the user side performs a transfer to a bank/a money transfer or payment at a convenience store on the basis of the bill.

However, on the industrial company side which collects the service charges, issuance costs and mail costs of the bills which are issued to the users are very large, resulting in obstruction of a cost reduction. Also on the user side, he has to go out of his way to a financial institution or a convenience store for the purpose of paying. He is apt to forget the payment due to such a troublesomeness. Thus, even the industrial company side has to issue the bill to the user side again. Such a situation also becomes a factor of increasing the costs. There is also a problem such that since receipts of money are uncertain, a trade account receivable is large. Moreover, even when there are receipts of money, there are various factors of obstructing the cost reduction, that is, a factor such that the receipts of money and a request have to be manually confirmed, and the like.

As means for solving such a problem, in case of a sale of goods or the like on the Internet, there is a method whereby requested contents are prepared on a screen and the user side prints such a screen image and makes payment at the convenience store or the like by using the screen image in place of a transfer sheet or the like. According to such a method, however, the user side has to print the requested contents, write predetermined items onto a printed paper, and subsequently go to the convenience store or the like. A burden on the user side further increases or the like. Such a method is not a fundamental solving measure.

OBJECTS AND SUMMARY OF THE INVENTION

It is, therefore, an object of the invention to provide a charge collecting system which can improve convenience of the user and contribute to a cost reduction of a sales shop.

To accomplish the above object, the present invention uses the following constructions.

According to the first aspect of the invention, there is provided a charge collecting system comprising:

a notice information management unit which manages requested contents to be notified to the users via a network in correspondence to each address on the network provided in correspondence to each of the users, respectively;

a requested contents notice unit which transmits the requested contents which are managed by the notice information management unit and the addresses of the users corresponding to the requested contents to each of the users via the network by Email; and a settlement unit which makes a settlement on the network when there is an access to the address notified by the requested contents notice unit from the user corresponding to the address and a paying instruction regarding the requested contents from the user is received.

The charge collecting system can further comprise a use information management unit which manages a period of time which has been predetermined every user and during which the use of the charge collecting system is permitted, the notice information management unit manages the notice information on the basis of use management information including the requested contents and the address of the use information management unit, and the requested contents notice unit receives a control of the transmission of the Email in accordance with the use management information of the use information management unit.

For example, the requested contents notice unit is permitted to transmit the Email to the user only in the period of time during which the use is permitted by the use management information of each user.

For example, the settlement unit makes a real-time settlement on the network when there is the access to the address notified by the requested contents notice unit from the user corresponding to the address and the paying instruction regarding the requested contents from the user is received.

The settlement unit has, for example, a wallet which is used for the real-time settlement and which corresponds to each user.

The settlement unit makes the settlement in accordance with, for example, an SET (Secure Electronic Transactions).

The settlement by the settlement unit is, for example, a credit settlement using a credit card.

The settlement by- the settlement unit is, for example, a settlement using prepaid-type electronic money.

The address is, for example, a URL (Uniform Resource Locator) on the Internet.

According to the second aspect of the invention, there is provided a control program for a charge collecting system, wherein the program allows a computer constructing the charge collecting system to function and execute:

a use information management step which manages a period of time which has been predetermined every user and during which use of the charge collecting system is permitted;

a notice information management step which manages requested contents to be notified to the users via a network in correspondence to each address on the network provided in correspondence to each of the users, on the basis of use management information which is managed by the use information management step;

a requested contents notice step which transmits the requested contents which are managed by the notice information management step and the addresses on the network of the users corresponding to the requested contents to the users by Email via the network in accordance with the use management information in the use information management step; and a settlement step which makes a settlement on the network when there is an access to the address notified by the requested contents notice step from the user corresponding to the address and a paying instruction regarding the requested contents from the user is received.

The above and other objects and features of the present invention will become apparent from the following detailed description and the appended claims with reference to the accompanying drawings.

BRIEF DESCRIPTION OF THE DRAWINGS

FIG. 4 is a sequence chart showing the operation in case of a prepayment according to the embodiment.

DETAILED DESCRIPTION OF THE PREFERRED EMBODIMENT

An embodiment of the invention will be described in detail hereinbelow.

<Embodiment>

<Construction>

Figure 1:
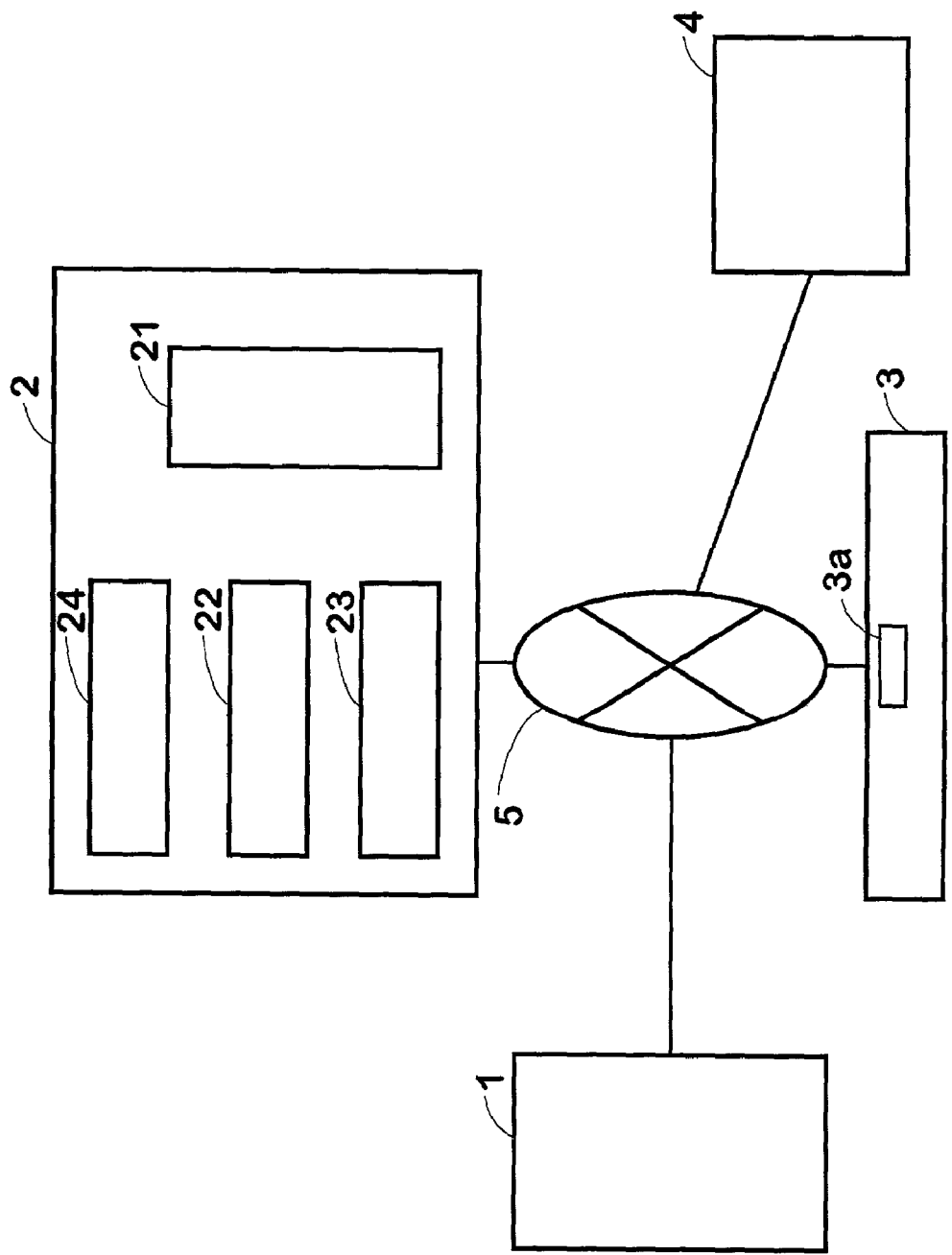
FIG. 1 is a constructional diagram showing a specific example of a charge collecting system of the invention.

FIG. 1 is a constructional diagram showing an embodiment of a charge collecting system of the invention.

The system of the invention comprises a user terminal 1, a sales shop 2, a wallet service providing company 3, a settlement institution 4, and a network 5.

The user terminal 1 comprises a cellular phone which can be connected to the network 5, a portable terminal called PDA (Personal Digital Assistants), or electronic equipment such as a personal computer. A Web browser or the like which is operated by the users has been installed in the terminal 1.

The sales shop 2 is a store having an electronic communicating apparatus which can be connected to the network 5 and is a store such as a mail-order sales company. The electronic communicating apparatus equipped by the sales shop 2 has use an information management unit 21, a notice information management unit 22, a requested contents notice unit 23, and a settlement unit 24.

The use information management unit 21 is a unit which manages information of an available period such as "monthly" of the user and use information of each user such as information of goods which were purchased within the period. The use information management unit 21 has a user information management database (not shown) for managing those information. The notice information management unit 22 is a unit which forms and manages the requested contents of each user on the basis of the management information of the use information management unit 21 in correspondence to an address (URL: Uniform Resource Locator) on the Internet provided for every user. The requested contents notice unit 23 is a unit which notifies a mail address of the user terminal 1 which has previously been notified of the requested contents formed by the notice information management unit 22.

The settlement unit 24 is a unit which makes an Internet debit settlement as a real-time settlement on the Internet in accordance with a protocol specification called SET (Secure Electronic Transactions) for safely making a settlement on the Internet. That is, when there is an access from the user terminal 1 to the URL notified by the requested contents notice unit 23 and a paying instruction is issued from the terminal, the settlement unit 24 makes the Internet debit settlement by using a wallet of the user which is provided by the wallet service providing company 3. As an Internet debit settlement, for example, a real-time settlement unit called an Interdebit which is proposed by JIPPA (Japan Internet Payment Promotion Association) is used.

Specifically speaking, the sales shop 2 has, for example, an electronic communicating apparatus having the following construction. That is, the electronic communicating apparatus comprises: a Web server for transmitting and receiving various data on the Internet; an AP (Application) server having various application software for performing a commercial transaction on the Internet and databases such as goods database, customer database, order reception database, user information management database, and the like; a mail server for transmitting, receiving, and managing various Email; and a POS (Point of Sales) server for performing a settling process. Details of those constructions are not shown and are omitted. However, the use information management unit 21 is realized by the AP server. The notice information management unit 22 is realized by the Web server and AP server. Further, the requested contents notice unit 23 is realized by the mail server. The settlement unit 24 is realized by the POS server.

Further in detail, the computer for each server executes a control program corresponding to the use information management unit 21 to the settlement unit 24, so that the units 21 to 24 are realized.

The wallet service providing company 3 has a wallet server 3a connected to the network. The wallet service providing company 3 provides a wallet (server wallet function) having a function as a virtual electronic wallet on the network to the user terminal 1 and provides services regarding the settling process which is executed to the user by the settlement institution 4.

The settlement institution 4 is a financial institution such as a bank for making the Internet debit settlement and is a settlement institution which has an account of the user and an account of the sales shop 2 and executes a payment transaction process for paying from the user to the sales shop 2.

The network 5 is, for example, an Internet and is a network for mutually connecting the user terminal 1, sales shop 2, wallet service providing company 3, and settlement institution 4.

<Operation>

The operation of the charge collecting system according to the invention will now be described.

First, a case where the system is applied to a sales method of a deferred payment of the user whereby use by the user is managed every predetermined period such as "monthly" and a charged money amount for this period is determined on a predetermined closing date will be described.

[Operation of System in Deferred Payment]

First, the user 1 registers his own mail address on the Internet into the sales shop 2 when he performs a transaction with the sales shop 2.

For example, the user 1 has his own account in the settlement institution 4 and preliminarily makes a use contract of the Internet debit settlement by using the wallet service of the wallet service providing company 3. For example, the sales shop 2 is a virtual shop which has a homepage of sales goods on the Internet and accepts the purchase of the goods on the Internet.

Figure 2:
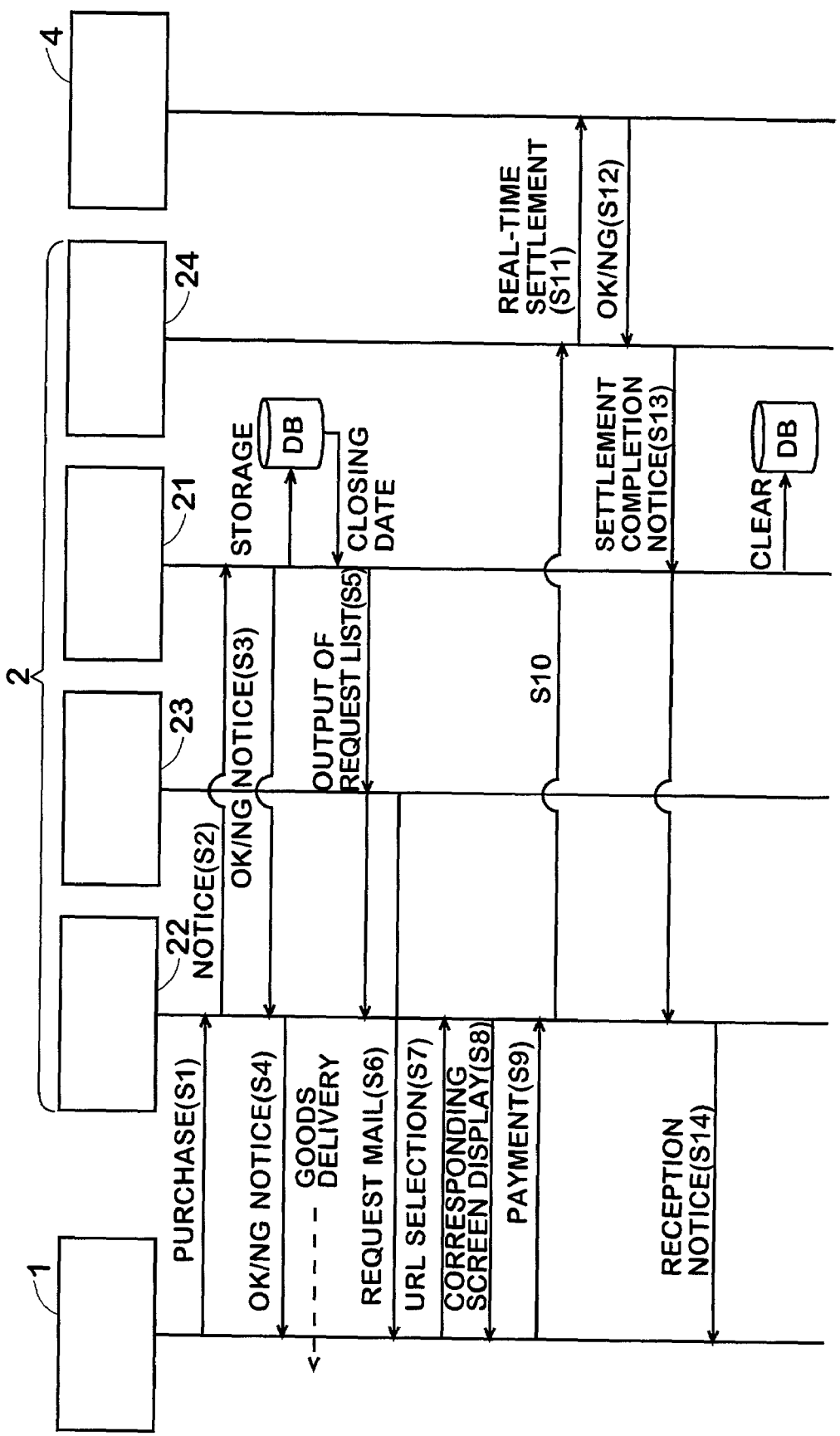
FIG. 2 is a sequence chart showing the operation in case of a deferred payment according to an embodiment of the invention.

FIG. 2 is a sequence chart showing the operation in case of the deferred payment in the embodiment.

The user purchases goods from the sales shop 2 by using the user terminal 1 (step S1). Thus, the use information management unit 21 is notified of the purchase information by the notice information management unit 22 (step S2). The user has been registered in the use information management unit 21. The use information management unit 21 discriminates whether the user is an authorized person who is permitted to purchase the goods or not. If a discrimination result indicates OK, the use information management unit 21 notifies the notice information management unit 22 of acknowledgment information (step S3). The user terminal 1 is notified of the acknowledgment information from the notice information management unit 22 (step S4). If it is NG (No good), the user terminal 1 is notified of unavailable information.

By those operations, when the user purchases goods on the homepage, a message "Thank you for buying. The goods will be delivered in xx days." showing a deal of purchase is displayed on the screen of the user terminal 1. After that, the sales goods are delivered to the user by another unit.

The use information management unit 21 manages the use by the user as mentioned above by user information management database (DB). When the closing date determined by the user comes, the use information management unit 21 forms a list of requested contents of that month and notifies the notice information management unit 22 and requested contents notice unit 23 of the list of the requested contents (step S5). The notice information management unit 22 forms the requested contents in correspondence to the URL prepared every user, and the requested contents notice unit 23 transmits the requested contents and his own URL to the mail address of the user (step S6).

Figure 3:
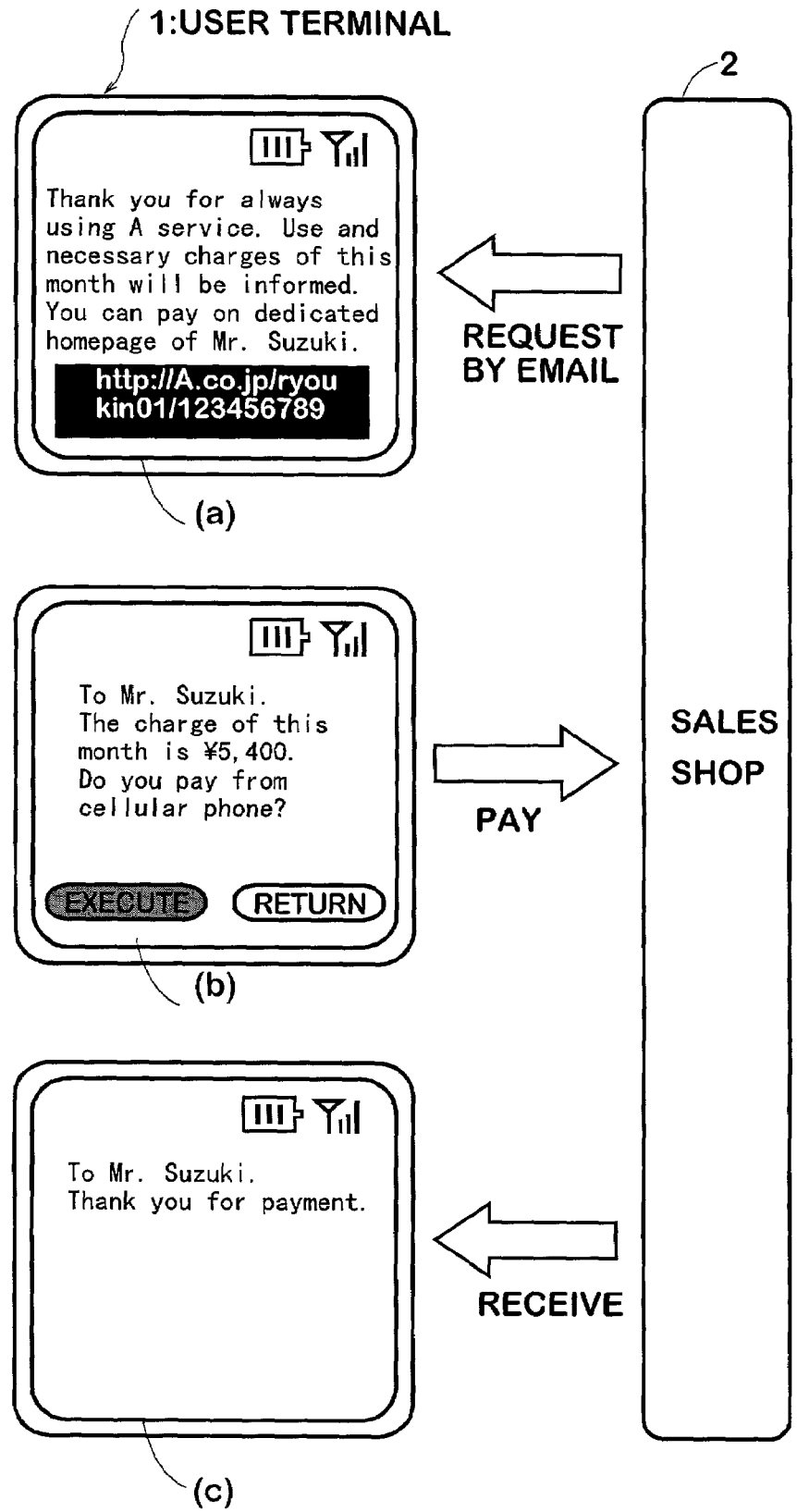
FIG. 3 is an explanatory diagram showing a relation between screen display contents of a user terminal and a sales shop.

FIG. 3 is an explanatory diagram showing a relation between the contents displayed on the screen of the user terminal 1 and the sales shop 2.

As shown in (a) in FIG. 3, the Email of the requested contents and the URL for payment provided for each user are notified. The URL can be accessed by selecting this portion. In case of paying, the user selects the URL (step S7). Information of the charged money amount and the like has been prepared and the requested contents as shown in (b) in FIG. 3 are displayed on the screen of the user terminal 1 (step S8).

When the user selects "EXECUTE" on such a screen (steps S9 and S10), the settlement unit 24 makes the Internet debit settlement to the settlement institution 4 by using the wallet services of the wallet service providing company 3 (step S11). That is, the user selects "EXECUTE" on such a screen shown in (b) in FIG. 3, so that a log-in of the wallet of the user is performed and the Internet debit settlement is made via a process such as a predetermined account balance confirmation which is executed in the settlement institution 4. If withdrawal of a money amount from the account of the user to the account of the sales shop 2 is OK, the settlement unit 24 is notified of the fact that the settlement has been completed from the settlement institution 4 (step S12).

When the settlement unit 24 receives a settlement completion notice, the settlement unit 24 notifies the use information management unit 21 and notice information management unit 22 of the information indicative of the completion of the settlement (step S13). The notice information management unit 22 displays a message "Thank you for payment" onto the screen of the user terminal 1 (step S14) as shown in (c) in FIG. 3.

The use information management unit 21 notified of the settlement completion information from the settlement unit 24 clears the request balance of the user.

Subsequently, a case where the system according to the invention is applied to a prepayment sales method whereby a predetermined money amount is collected from the user and, thereafter, goods are provided to the user for a predetermined period of time will be described.

[Operation of System in Prepayment]

First, in a manner similar to the case of the foregoing operation of the deferred payment, when making a transaction with the sales shop 2, the user 1 registers his own mail address on the Internet into the sales shop 2. For example, the user has his own account in the settlement institution 4 and previously makes a use contract of the Internet debit settlement by using the wallet services of the wallet service providing company 3. In the embodiment, the sales shop 2 is a virtual shop for distributing contents such as music and images on the Internet on a unit basis of a predetermined period such as month or year. It is assumed that the user has already paid the charge for the predetermined period to the sales shop 2 and received the service of the contents distribution therefrom.

FIG. 4 is a sequence chart showing the operation in case of the prepayment according to the embodiment.

The use information management unit 21 manages an available period to the user. When a termination date of the available period approaches, the use information management unit 21 forms a list of the requested contents to the user and notifies the notice information management unit 22 and requested contents notice unit 23 of the list (step S21). The notice information management unit 22 forms the requested contents in correspondence to the URL prepared every user. On the other hand, the requested contents notice unit 23 transmits the requested contents and the URL to the mail address of the user by Email (step S22). Although contents of the Email are fundamentally similar to those shown in (a) in FIG. 3, they are different from those in the foregoing example with respect to the point such that a message "use charges of this year will be informed" regarding the prepayment is displayed.

When this Email is received, the user selects the URL included in the Email (step S23). The information such as a charged money amount and the like has been prepared in the URL. Contents of the use charges of this year are displayed on the screen of the user terminal 1 (step S24).

Thus, the user issues a paying instruction from the terminal 1 (steps S25 and S26). The settlement unit 24 makes the Internet debit settlement to the settlement institution 4 by using the wallet service of the wallet service providing company 3 to the user (step S27). The operation in this case is similar to that in case of the deferred payment mentioned above. If the payment from the account of the user to that of the sales shop 2 is OK, the settlement unit 24 is notified of the fact that the settlement has been completed by the settlement institution 4 (step S28).

Thus, the settlement unit 24 notifies the use information management unit 21 and notice information management unit 22 of the information indicative of the completion of the settlement (step S29). The notice information management unit 22 displays a message "thank you for payment" onto the screen of the user terminal 1 (step S30).

The use information management unit 21 notified of the information showing the settlement completion by the settlement unit 24 updates the information of the use period to the user.

After that, when there is a contents use instruction from the user terminal 1 (step S31), if the notice information management unit 22 receives this information, the use information management unit 21 discriminates whether the use period is an available period to the user or not with reference to the use information management database and notifies the notice information management unit 22 of a result (available/unavailable) (step S32). If the discrimination result shows "available", the notice information management unit 22 displays a message showing that the contents is available onto the screen of the terminal 1. After that, the contents is distributed by a contents distributing unit (not shown) (step S33). If the contents is unavailable, a message showing it is displayed.

<Effects>

As mentioned above, according to the embodiment, the user is notified of the requested contents by the Email, and when the user access the URL of every user included in the Email and instructs the payment, the Internet debit settlement is made, so that the following effects are obtained on the user side and the sales shop side.

[Effects on the User Side]

There is no need to go to the financial institution or convenience store for the purpose of paying, and the user can easily pay.

Even the user who does not use a credit card can easily use the present system.

In case of the sales such that the paying process is executed after the goods were purchased, since the user can pay after confirming the goods, the mail-order sale can be used at rest.

The cheap goods which can be accomplished by the introduction of the present system and are realized by the cost reduction on the sales shop 2 side can be purchased.

[Effects on the Sales Shop 2 Side]

Since the bill is transmitted by Email, the issuance and mail costs of the bill can be remarkably reduced.

Since the processes such that (the Email is transmitted) →(the user who received the Email instructs the payment)→(the real-time settlement) are executed in an extremely short period, the period of time which is used until the receipts of money is short, so that a trade account receivable decreases, and a cash flow can be improved.

Since a confirmation is made simultaneously with that the user makes the settlement, a manual confirming process can be eliminated.

For example, in addition to the conventional payment by the transfer to the bank, since the number of settlement units which can be selected by the user such that the payment by the present system is prepared and the like increases, the number of business chances can be increased.

Since the costs can be reduced in terms of various points such that the issuance and mail costs of the bill and the trade account receivable decrease, and the like, the low price of the goods can be realized, so that a customer collecting ratio can be further improved.

According to the sale such that the requesting process is executed after the goods were sold, even if there is a cancellation before the user pays, a troublesomeness for a refundment of the charges and a settlement commission can be omitted, so that it is possible to also sufficiently cope with cooling-off.

<Modifications>

Although the embodiment has been described with respect to the case where the sales shop 2 is the virtual shop for making a commercial transaction on the Internet, the sales method is not limited to such a virtual shop. The system of the present invention can be applied to payment of sales in actual shops and also applied to any type of industry. The goods to be dealt can be also books, groceries, clothes, CDs, video tapes, life miscellaneous goods, special products, and the like.

Further, particularly, a large effect can be obtained in the case where the system of the invention is applied to a settlement of charges for managing the use period, such as telephone charges, monitoring charges, rent, subscription charges, utility charges, insurance premium, and the like.

In the embodiment, the settlement unit 24 for making the Internet debit settlement by the SET settlement has been provided for the sales shop 2. However, for example, in a system such that the wallet service providing company 3 has the POS server and requests a process from the POS function (POS client) on the sales shop 2 side, the settlement unit can be also realized by using the POS server of such a wallet service providing company 3.

According to the embodiment, although the wallet service providing company 3 has provided the function for making the Internet debit settlement, the settlement unit can be also realized by preparing the wallet function on the user terminal 1 side.

Further, although the Internet debit settlement has been used as a settlement unit in the embodiment, other various settlements which are made on the Internet, for example, a credit settlement, a settlement using prepaid-type electronic money, and the like can be used.

The present invention is not limited to the foregoing embodiment but many modifications and variations are possible within the spirit and scope of the appended claims of the invention.

What is claimed is:

1. A charge collecting system connected by a network to user terminals operated by a plurality of users, the system comprising:

a use information management unit which manages use information of the plurality of users and generates requested contents related to such use information for each of the plurality of users as of a closing date of a predetermined period of time during which each respective user is authorized to use the charge collection system;

a notice information management unit which manages the requested contents to be notified to each of the plurality of users via the network according to a corresponding user address on the network provided by the use information management unit for each of the respective users;

a requested contents notice unit which transmits to each of the users via the network, the corresponding requested contents and a payment execution information including an address of the notice information management unit to which a paying instruction regarding the corresponding requested contents is to be sent; and a settlement unit which makes a real-time settlement on the network when there is an access by one of the plurality of users to the paying address notified by the requested contents notice unit and the paying instruction regarding the corresponding requested contents from the one user is received.

2. A system according to claim 1, wherein said requested contents notice unit transmits the requested contents to each of the users by Email in accordance with the use information managed by the use information management unit.

3. A system according to claim 1, wherein said requested contents notice unit is permitted to transmit said requested contents to said user only in the period of time during which the use is permitted by said use management information of each of said users.

4. A system according to claim 1, wherein the predetermined period is one month.

5. A system according to claim 1, wherein the system is further connected by the network to a wallet server comprising an electronic wallet corresponding to each of the plurality of users, such that the settlement unit has access to the electronic wallets for the real-time settlement associated with each of the users.

6. A system according to claim 1, wherein said settlement unit makes the settlement in accordance with an SET (Secure Electronic Transactions).

7. A system according to claim 1, wherein said settlement by said settlement unit is a credit settlement using a credit card.

8. A system according to claim 1, wherein said settlement by said settlement unit is a settlement using prepaid-type electronic money.

9. A system according to claim 1, wherein each of the respective addresses of the users and the paying address is a URL (Uniform Resource Locator) on the Internet.

10. A computer program encoded on a computer readable medium for a charge collecting system, wherein said program is executable on a computer controlling said charge collecting system so as to cause said system to perform:
  a use information management step for managing use information of a plurality of users and generating requested contents related to such use information for each of the plurality of users as of a closing date of a predetermined period of time during which each respective user is authorized to use the charge collection system;
  a notice information management step for managing the requested contents to be notified to each of the plurality of users via a network according to a corresponding user address on said network provided for each of the respective users as part of the use management information which is managed in said use information management step;
  a requested contents notice step for transmitting to each of the users by Email via the network the corresponding requested contents managed in the notice information management step and a payment execution information including a paying address to which a paying instruction regarding the corresponding requested contents is to be sent; and
  a settlement step for making real-time settlement on the network when there is an access by one of the plurality of users to the paying address notified in the requested contents notice step and the paying instruction regarding the corresponding requested contents from the one user is received.

11. A charge collecting system connected by a network to user terminals operated by a plurality of users, the system comprising:
  a use information management unit which manages use information of the plurality of users and generates requested contents for respective ones of the plurality of users as of a termination date of a current period during which each respective user has an authorization to use the charge collection system;
  a notice information management unit which manages the requested contents to be notified to the respective ones of the plurality of users via the network according to a corresponding user address on the network provided by the use information management unit for each of the respective users;
  a requested contents notice unit which transmits to the respective ones of the users via the network, the corresponding requested contents and a payment execution information including an address of the notice information management unit to which a paying instruction regarding the corresponding requested contents is to be sent; and
  a settlement unit which makes a real-time settlement on the network when there is an access by any one of the respective users to the paying address notified by the requested contents notice unit and the paying instruction regarding the corresponding requested contents from the one user is received,
  wherein the settlement unit provides the use information management unit with information indicative of completion of the settlement with respect to the one user and the use information management unit updates the authorization of the one user to authorize use of the charge collection system during a next period following the current period on the basis of the information.

12. A system according to claim 11, wherein said requested contents notice unit transmits the requested contents to the respective ones of the users by Email in accordance with the use information managed by the use information management unit.

13. A system according to claim 11, wherein the notice information management unit is able to receive content use instructions via the network from any one of the plurality of users, the use information management unit is able to determine, based on the information indicative of settlement completion, whether the content use instructions were received by the notice information management unit during the next period for which the one user is authorized to use the charge collection system, and the notice information management unit is further able to transmit notification to the one user via the network of the determination made by the use information management unit.

14. A system according to claim 13, further comprising:
  a contents distributing unit for distributing contents to the one user when the determination is made by the use information management unit that the content use instructions were received during the next period for which the one user is authorized to use the charge collection system.

15. A system according to claim 11, wherein the current period and the next period are each one month.

16. A system according to claim 11, wherein the system is further connected by the network to a wallet server comprising an electronic wallet corresponding to each of the plurality of users, such that the settlement unit has access to the electronic wallets for the real-time settlement associated with each of the users.

17. A system according to claim 11, wherein said settlement unit makes the settlement in accordance with an SET (Secure Electronic Transactions).

18. A system according to claim 11, wherein said settlement by said settlement unit is a credit settlement using a credit card.

19. A system according to claim 11, wherein said settlement by said settlement unit is a settlement using prepaid-type electronic money.

20. A system according to claim 11, wherein each of the respective addresses of the users and the paying address is a URL (Uniform Resource Locator) on the Internet.

* * * * *